United States Patent
Cloutier

Patent Number: 5,829,426
Date of Patent: Nov. 3, 1998

[54] APPARATUS FOR HOLDING THE LID OF BARBEQUE GRILL

[76] Inventor: Andre Cloutier, 121 King St., Bristol, Conn. 06010

[21] Appl. No.: 754,052

[22] Filed: Nov. 20, 1996

[51] Int. Cl.$^6$ ............................................. F24C 3/00
[52] U.S. Cl. .................. 126/41 R; 126/25 R; 126/190; 126/192
[58] Field of Search .............................. 126/41 R, 25 R, 126/190, 192

[56] References Cited

U.S. PATENT DOCUMENTS

| | | | |
|---|---|---|---|
| 2,520,578 | 8/1950 | Treloar | 126/25 R |
| 2,792,773 | 5/1957 | Barker | 126/25 A |
| 3,938,493 | 2/1976 | Bauer | 126/41 R |
| 4,256,080 | 3/1981 | Seach | 126/41 R |
| 4,584,984 | 4/1986 | Croft | 126/25 R |
| 4,836,179 | 6/1989 | Schlosser et al. | 126/41 R |
| 5,178,126 | 1/1993 | Beller | 126/41 R |
| 5,213,299 | 5/1993 | Henry | 126/25 R |

Primary Examiner—Larry Jones
Attorney, Agent, or Firm—Robert S. Smith

[57] ABSTRACT

A positioning mechanism for a cooking apparatus or a cooking apparatus that includes the the positioning mechanism. The cooking apparatus includes a concave open top housing, a cover dimensioned and configured to engage the open top housing, a hinge coupling the housing and the cover to allow movement of the cover from a fully closed position to a fully open position, and a positioning mechanism to lock the relative positions of the housing and the cover, the positioning mechanism includes an L-shaped rod fixed to the cover and an eye bolt fixed to the housing, the rod extending through the eye bolt, the positioning mechanism further including a generally planar member having at least one part thereof having an upstanding portion for impacting the eye bolt and moving the planar member into oblique relationship with respect to the rod whereby the planar member is locked with respect to the rod. In some forms of the invention the upstanding portion may be a knee shaped bend. The planar member may have an extension from one part thereof and a handle may be fixed to an extremity of the extension.

10 Claims, 2 Drawing Sheets

APPARATUS FOR HOLDING THE LID OF BARBEQUE GRILL

BACKGROUND OF THE INVENTION

The invention relates to cooking apparatus used outdoors such as barbecue grills and particularly to apparatus for holding the lid or cover in any of a plurality of partially open positions as well as a fully open position. Typically, such cooking apparatus has a concave housing having an open top. Often the heat required for cooking is produced by burning charcoal or a burning gas. Usually a grill is disposed above the source of heat near the open top of the housing. In a common structure the apparatus includes a concave cover mounted by hinges on the housing. The hinges allow movement of the cover between a fully closed position in which the periphery of the cover is substantially coincident with the periphery of the open top of the housing and a fully open position in which the cover allows heat to rise from the housing with substantially no impediment.

The angular position of the hinged cover determines the temperature within the cooking apparatus. In order to control the temperature within the cooking apparatus and control the procession of the cooking process it is known to place various objects intermediate housing and the cover. While this may be satisfactory in some cases, it does not permit the precise positioning of the cover with respect to the housing over the full range of possible relative positions. The possible positions that can be attained with a spacer or blocking member is limited by the size and shape of the spacer. The natural effect of gravity will tend to close the cover and eject the spacer in some cases. Another problem may be encountered if the spacer is flammable or produces objectionable odors or melts as a result of the heat produced within the housing.

An object of the invention is to provide a design that enables precise positioning of the cover of a cooking apparatus relative to the housing of that apparatus.

Another object of the invention is to provide apparatus that will not melt or produce objectionable odors when exposed to the heat generated within the apparatus.

It is an object of the invention to provide apparatus that can be retrofitted to existing cooking apparatus.

Another object of the invention is to provide apparatus that is easy and safe for a person to use despite the intensity of the heat produced by the cooking apparatus.

It is also an object of the invention to provide apparatus that is inexpensive to manufacture.

Another object of the invention is to provide apparatus that is durable and capable of withstanding the elements of nature.

SUMMARY OF THE INVENTION

It has now been found that these and other objects of the invention may be attained in either an attachment for a cooking apparatus or a cooking apparatus that includes the present invention. The cooking apparatus includes a concave open top housing, a cover dimensioned and configured to engage the open top housing, a hinge coupling the housing and the cover to allow movement of the cover from a fully closed position to a fully open position, and a positioning mechanism to lock the relative positions of the housing and the cover, the positioning mechanism includes an L-shaped rod fixed to the cover and an eye bolt fixed to the housing, the rod extending through the eye bolt, the positioning mechanism further including a generally planar member having at least one part thereof having an upstanding portion for impacting the eye bolt and moving the planar member into oblique relationship with respect to the rod whereby the planar member is locked with respect to the rod.

In some forms of the invention the upstanding portion may be a knee shaped bend. The planar member may have an extension from one part thereof and a handle may be fixed to an extremity of the extension.

BRIEF DESCRIPTION OF THE DRAWING

The invention will be better understood by reference to the accompanying drawing in which.

DESCRIPTION OF THE PREFERRED EMBODIMENT

Figure 1:
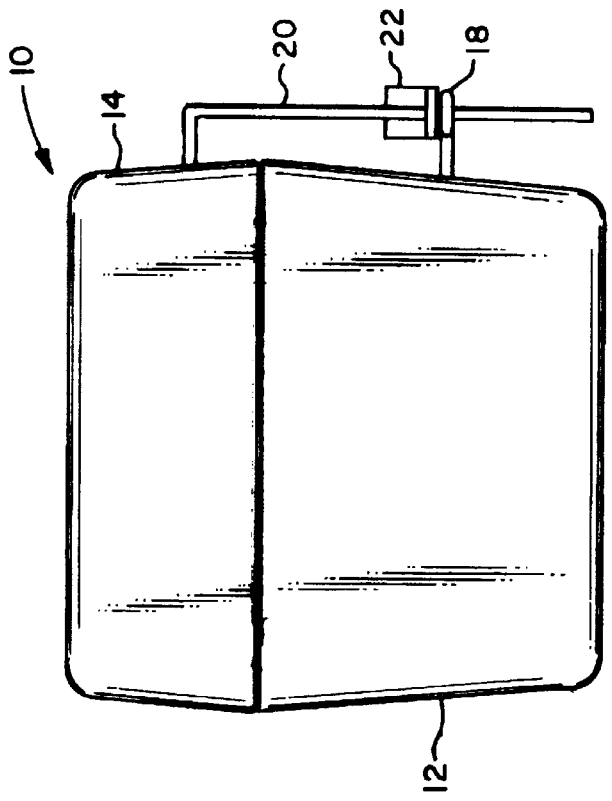
FIG. 1 is a front elevational view of a cooking apparatus incorporating the positioning mechanism in accordance with one form of the invention.
Figure 2:
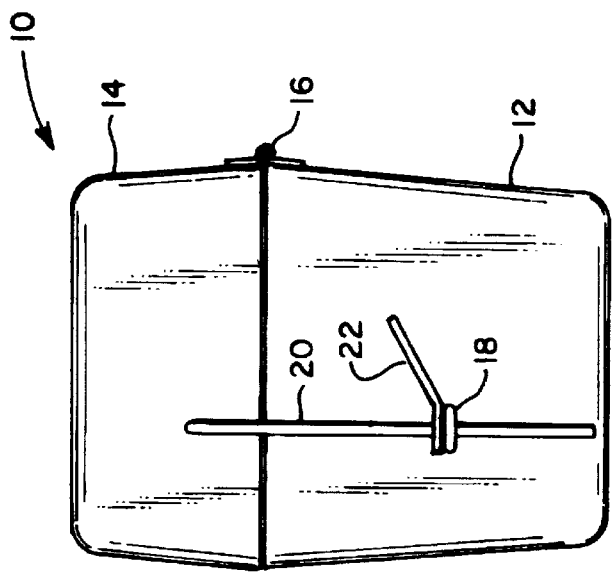
FIG. 2 is a side elevational view of the cooking apparatus and positioning mechanism shown in FIG. 1.
Figure 3:
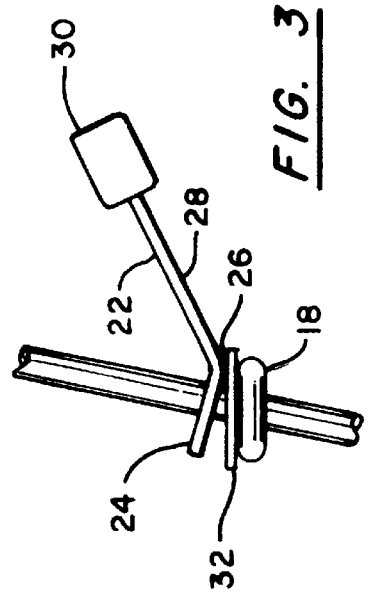
FIG. 3 is a fragmentary side elevational view illustrating the second, third, fourth and fifth panels living hinged to the first panel and the sixth panel living hinged to the fifth panel.
Figure 4:
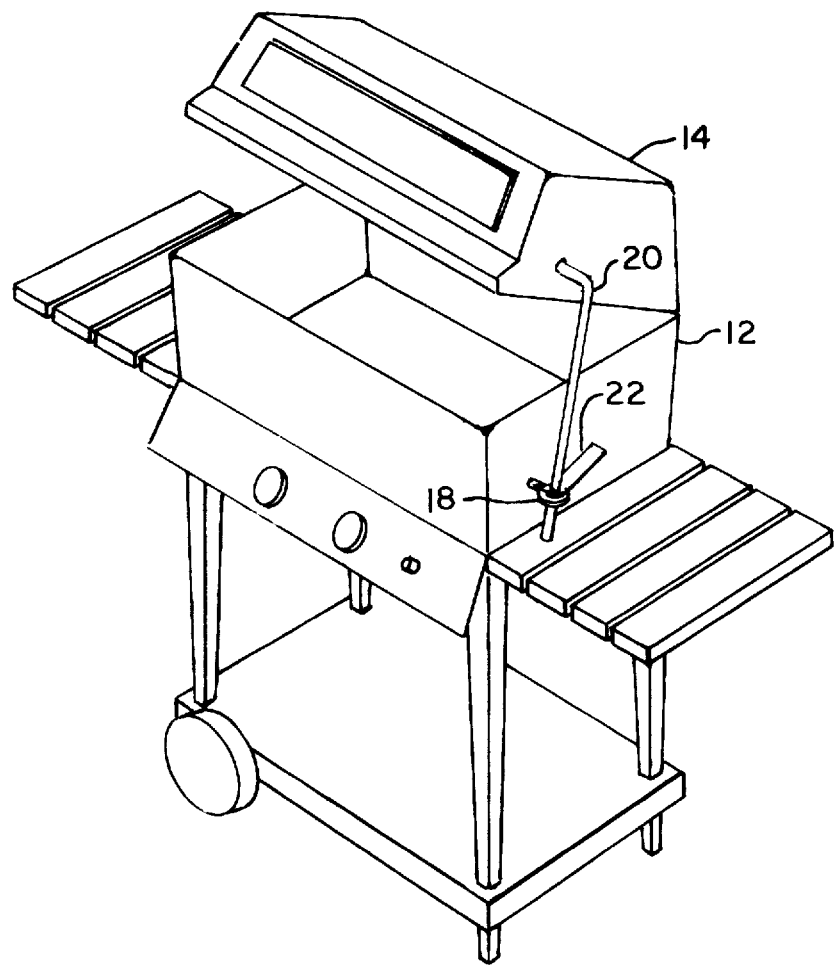
FIG. 4 is a fragmentary side elevational view illustrating a similar positioning mechanism in greater detail.

Referring now to FIGS. 1–6 there is shown a cooking apparatus 10 having a concave housing 12 and a mating cover 14. Typically, the cover 14 is dimensioned and configured with a periphery of the concave extent thereof that is coincident with the periphery of the open top of the housing 12. One or more hinges 16 join the cover 14 to the housing 12. In the preferred embodiment an eye bolt 18 is fixed to the side of the housing 12. Secured to the cover 14 is an L-shaped rod 20. The L-shaped rod 20 has a long leg that is generally vertically disposed in all relative positions of the cover 14 and the housing 12. In addition the L-shaped rod 20 has a short legged that is horizontally disposed in all relative positions of the cover 14 and the housing 12. The long leg of the L-shaped rod 20 extends through the eye of the eye bolt 18 throughout the movement of the cover 14 from the fully closed to the fully open position. Usually the L-shaped rod 20 will be mounted to the cover 14 in a manner that allows swivel movement between the L-shaped rod 20 and the housing 14. This swivel movement allows the rod 20 to stay within the eye of the eye bolt 18 throughout the travel of the cover 14 from the fully closed position to the fully open position.

A locking member 21 has a bore 24 extending through a lip 22 thereof. The rod 20 extends through the bore 24. The lip 22 has a knee 26 on one side thereof to which a stem 28 and handle 30 are attached. Some embodiments of the invention may also have a washer 32 disposed on the rod 32 at a point axially intermediate the lip 24 and the eye bolt 18. In operation the knee 26 will strike the washer 32 or the eye bolt 18 and this will cause the lip 24 to move to a position that is oblique with respect to the axis of the rod 20. This oblique position will cause a locking action that will hold the cover 14 in a position determined by the user. More particularly, the user may grip the handle 30 to tip the lip 24 with respect to the rod 20. In other words, the user will position the lip 24 so that the lip is perpendicular to the rod 24 to allow movement axially along the rod 20.

It will thus be seen at the user may easily position the cover 14 in any desired position and may thus establish the conditions necessary for properly cooking any specific food.

It will also be apparent that the positioning mechanism in accordance with the present invention may be easily retrofitted on existing cooking apparatus.

Although the apparatus in accordance with the present invention has been described as having a knee 26 it will be understood that other forms are possible without departing from the present invention. The mechanism in accordance with the present invention has some general similarity to the mechanism sometimes used on pneumatic door closers of the type sometimes used on screen doors. At least some of these mechanisms use a washer like member that has been stamped in a form that produces an upstanding part at one angular part thereof. Such constructions are possible alternatives to the preferred form of the present invention.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A cooking apparatus which comprises:
   a concave open top housing;
   a cover dimensioned and configured to engage said open top housing;
   a hinge coupling said housing and said cover to allow movement of said cover from a fully closed position to a fully open position; and
   a positioning mechanism to lock the relative positions of said housing and said cover, said positioning mechanism includes an L-shaped rod fixed to said cover and an eye bolt fixed to said housing, said eye bolt having an eye, said rod being elongated and having an axial portion extending through said eye, said axial portion having an axis, said positioning mechanism further including a generally planar member having a body having a hole therein, said hole being dimensioned and configured for sliding axial movement along said axial portion, at least one part of said generally planar member having an upstanding portion for impacting said eye bolt and moving said planar member into oblique relationship with respect to said axis of said axial portion of said rod whereby said planar member is locked with respect to said rod.

2. The apparatus as described in claim 1 wherein:
   said upstanding portion is a knee shaped bend.

3. The apparatus as described in claim 2 wherein:
   said planar member has an extension from one part thereof.

4. The apparatus as described in claim 3 further including:
   a handle fixed to an extremity of said extension.

5. The apparatus as described in claim 4 wherein:
   said axial portion is a rectilinear portion.

6. An attachment for attachment to a cooking apparatus having a concave open top housing, a cover dimensioned and configured to engage said open top housing, a hinge coupling said housing and said cover to allow movement of said cover from a fully closed position to a fully open position having a positioning mechanism to lock the relative positions of said housing and said cover which comprises:
   said positioning mechanism including an L-shaped rod fixed to the cover and an eye bolt fixed to said housing, the eye bolt having an eye, the rod extending through the eye, said axial portion having an axis, said positioning mechanism further including a generally planar member having a body having a hole therein, said hole being dimensioned and configured for sliding axial movement along said axial portion, at least one part of said generally planar member having an upstanding portion for impacting said eye bolt and moving said planar member into oblique relationship with respect to said rod whereby said planar member is locked with respect to said rod.

7. The apparatus as described in claim 6 wherein:
   said upstanding portion is a knee shaped bend.

8. The apparatus as described in claim 7 wherein:
   said planar member has an extension from one part thereof.

9. The apparatus as described in claim 8 further including:
   a handle fixed to an extremity of said extension.

10. The apparatus as described in claim 9 wherein:
    said axial portion is a rectilinear portion.

* * * * *